United States Patent
Yamamoto

(12)
(10) Patent No.: US 6,310,863 B1
(45) Date of Patent: Oct. 30, 2001

(54) DUAL-BAND DATA COMMUNICATION DEVICE

(75) Inventor: Naoyuki Yamamoto, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/067,115

(22) Filed: Apr. 27, 1998

(30) Foreign Application Priority Data

May 16, 1997 (JP) .................................................. 9-141141

(51) Int. Cl.[7] ........................................................ H04J 1/00
(52) U.S. Cl. ...................... 370/281; 370/295; 370/480; 455/176.1
(58) Field of Search .................................. 370/276, 281, 370/295, 343, 480; 455/176.1, 188.1, 168.1, 170.1

(56) References Cited

U.S. PATENT DOCUMENTS 5,657,344 * 8/1997 Na ........................................ 375/219
5,926,466 * 7/1999 Ishida et al. .......................... 370/280
5,974,305 * 10/1999 Matero ............................... 455/188.1

* cited by examiner

Primary Examiner—Min Jung
(74) Attorney, Agent, or Firm—Pearne & Gordon LLP

(57) ABSTRACT

The direction of rotation of the phase of signals in a dual-band digital demodulation processing means 110 and a dual-band digital modulation processing means 112 is controlled in accordance with a band selection control means 113 for selecting a first-band local oscillator 105 or a second-band local oscillator 106 so as to be reversed an even number of times in total. The direction of rotation of the phase of signals is controlled to return its original direction of rotation finally even if there is a difference between the first and second bands in the high/low relationship between the transmission/reception frequency and the local oscillation frequency. Accordingly, reception data can be outputted properly, and a transmission wave can be outputted properly. Since it is possible to attain transmission and reception properly in any high/low relationship between the transmission/reception frequency and the local oscillation frequency, the degree of freedom in selecting the local oscillation frequency can be increased.

10 Claims, 6 Drawing Sheets

DUAL-BAND DATA COMMUNICATION DEVICE

BACKGROUND OF THE INVENTION

The present invention relates to a dual-band data communication device which can transmit and receive either one of two frequency bands while switching the two, and particularly relates to a dual-band data communication device which can be used with any high/low relationship between a transmission/reception frequency and a local oscillation frequency.

Basically, a data communication device performs transmission and reception by using only one frequency band. With only one frequency band, however, a data communication device might fail in communication when another device uses the same frequency band or when the frequency band cannot be used because of noise or the like. Therefore, dual-band data communication devices which can use two frequency bands selectively by switching these two bands have been used.

FIG. 10 is a block diagram of a conventional dual-band data communication device. In FIG. 10, the dual-band data communication device is constituted by: an antenna 101 for transmitting/receiving a transmission/reception wave efficiently; a duplexer 102 for separating the transmission/reception wave into a transmission wave and a reception wave; a receiver 103 for converting the reception wave into two orthogonal base-band reception signals RX-I and RX-Q, the former one of which is an in-phase component and the latter one of which is a quadrature component; a transmitter 104 for converting two orthogonal base-band transmission signals TX-I and TX-Q, the former one of which is an in-phase component and the latter one of which is a quadrature component, into a transmission wave; a first local oscillator 105 for a first band used for frequency-conversion in the transmitter and the receiver; a first local oscillator 106 for a second band used for the same purpose as the first local oscillator 105; a reception second local oscillator 107 used for orthogonal detection in the receiver; a transmission second local oscillator 108 used for orthogonal modulation in the transmitter; A/D converters 109 for converting the orthogonal base-band reception signals RX-I and RX-Q into digital orthogonal base-band reception signals respectively; a digital demodulation processing means 201 for demodulating the digital orthogonal base-band reception signals into reception data; D/A converters 111 for converting digital orthogonal base-band transmission signals into orthogonal base-band transmission signals TX-I and TX-Q respectively; a digital modulation processing means 601 for modulating transmission data into digital orthogonal base-band transmission signals; and a band selection control means 113 for controlling the mode as to which one of the first and second bands is used. The band selection control means 113 performs control for selection between the first local oscillator 105 for the first band and the first local oscillator 106 for the second band by using a band selection control signal 114 to thereby make it possible to perform control of selection as to which one of the first and second bands is to be used.

However, in such a conventional dual-band data communication device, it is necessary to fix the direction of phase rotation of the orthogonal base-band reception signals supplied into the digital demodulation processing means. This is because, if the direction of phase rotation changes so that the high/low relationship of frequency is inverted in frequency conversion, the data are inverted.

Let in-phase and quadrature components of digital orthogonal base-band signals be i(t) and q(t), respectively. The reception signals orthogonally modulated by $\cos(\omega t)$ and $\sin(\omega t)$ are frequency-converted with a local oscillation signal $\cos(\omega_0 t)$ as follows.

$$2\cos(\omega_0 t) \cdot \{i(t) \cdot \cos(\omega t) - q(t) \cdot \sin(\omega t)\} = i(t) \cdot \{\cos(\omega_0 + \omega)t +$$
$$\cos(\omega_0 - \omega)t\} - q(t) \cdot$$
$$\{\sin(\omega_0 + \omega)t - \sin(\omega_0 - \omega)t\}$$
$$= \{i(t) \cdot \cos(\omega_0 + \omega)t - q(t) \cdot$$
$$\sin(\omega_0 + \omega)t\} + \{i(t) \cdot$$
$$\cos(\omega_0 - \omega)t + q(t) \cdot \sin(\omega_0 - \omega)t\}$$

In the case of frequency conversion, the phase is not changed if the local oscillation frequency is made lower than the reception frequency, but the phase of the quadrature component is inverted if the local oscillation frequency is made higher than the reception frequency. If the local oscillation frequency is set to have a high/low relationship which is difference between the first and second bands, the phase of the quadrature component is inverted between the two bands, and the direction of rotation of the phase is reversed. Accordingly, in differential phase modulation, logic 1 and logic 0 are replaced by each other.

Therefore, there arose such a constraint condition that it was necessary to set the high/low relationship between the reception frequency and the local oscillation frequency in common between the first and second bands. Accordingly, there was a problem that the degree of freedom in designing the first-band local oscillator and the second-band local oscillator was reduced.

In the same manner, the phase is not changed if the local oscillation frequency is made lower than the reception frequency and signals the frequency of which is increased by addition are made transmission signals. However, the phase of the quadrature component is inverted if the local oscillation frequency is made higher than the reception frequency and signals the frequency of which is decreased by substraction are made transmission signals. If the local oscillation frequency is set to have a high/low relationship which is different between the first and second bands, the phase of the quadrature component is inverted between the two bands, and the direction of rotation of the phase is reversed. Accordingly, in differential phase modulation, logic 1 and logic 0 are replaced by each other.

Therefore, since the direction of rotation of the phase of the digital orthogonal base-band transmission signals outputted from the digital modulation processing means was fixed, there arose such a constraint condition that it was necessary to set the high/low relationship between the transmission frequency and the local oscillation frequency in common between the first and second bands. Accordingly, there was a problem that the degree of freedom in designing the first-band local oscillator and the second-band local oscillator was reduced.

SUMMARY OF THE INVENTION

In order to solve the foregoing conventional problems, an object of the present invention is to provide a dual-band data communication device in which the degree of freedom in designing a first-band local oscillator and a second-band local oscillator can be increased.

In order to solve the foregoing problems, according to the present invention, a dual-band data communication device comprises a dual-band digital demodulation processing means and a dual-band digital modulation processing means for performing demodulation and modulation properly, respectively, in use for a first band or a second band in response to selection control by a band selection control means for performing the control as to which one of a first-band local oscillator and a second-band local oscillator is used.

With such a configuration, modulation and demodulation can be performed properly in use of the first band or the second band regardless of the manner of setting the high/low relationship between the transmission/reception frequency and the local oscillation frequency. Accordingly, the degree of freedom in designing the first-band local oscillation frequency and the second-band local oscillation frequency is increased.

According to a first aspect of the present invention, provided is a dual-band data communication device comprising, at least, a receiver for converting a reception wave into orthogonal base-band reception signals, A/D converters for converting the orthogonal base-band reception signals into digital orthogonal base-band reception signals, a dual-band digital demodulation processing means for demodulating the digital orthogonal base-band reception signals into reception data, a dual-band digital modulation processing means for modulating transmission data into digital orthogonal base-band transmission signals, D/A converters for converting the digital orthogonal base-band transmission signals into orthogonal base-band transmission signals, a transmitter for converting the orthogonal base-band transmission signals into a transmission wave, and a band selection control means for controlling selection as to which one of a first band and a second band is used; wherein the dual-band digital demodulation processing means includes means for performing demodulation properly when selected one of the first band and the second band is used in accordance with selection control between a first band local oscillation and a second band local oscillation by the band selection control means. There is an effect that reception data can be outputted properly even if there is a difference between the first and second bands in the high/low relationship between the reception frequency and the local oscillation frequency.

In the above dual-band data communication device, according to a second aspect of the present invention, the dual-band digital modulation processing means includes means for performing modulation properly when selected one of the first band and the second band is used in accordance with the selection control between the first band local oscillation and the second band local oscillation by the band selection control means. There is an effect that a transmission wave can be outputted properly even if there is a difference between the first and second bands in the high/low relationship between the transmission frequency and the local oscillation frequency.

In the above dual-band data communication device, according to a third aspect of the present invention, the dual-band digital demodulation processing means including a digital demodulation processing means for performing demodulation properly when the first band is used, and a logical means for performing EXCLUSIVE-ORing between a band selection control signal from the band selection control means and reception data from the digital demodulation processing means. There is an effect that reception data can be outputted properly even if there is a difference between the first and second bands in the high/low relationship between the reception frequency and the local oscillation frequency.

In the above dual-band data communication device, according to a fourth aspect. of the present invention, the dual-band digital demodulation processing means includes a digital demodulation processing means for performing demodulation properly when the first band is used, and a replacement means for replacing two of the digital orthogonal base-band reception signals, one of which is an in-phase component and the other of which is a quadrature component, by each other in response to a band selection control signal from the band selection control means when the second band is used. There is an effect that reception data can be outputted properly even if there is a difference between the first and second bands in the high/low relationship between the reception frequency and the local oscillation frequency.

In the above dual-band data communication device, according to a fifth aspect of the present invention, the dual-band digital demodulation processing means includes a digital demodulation processing means for performing demodulation properly when the first band is used, and a replacement means for replacing two of the digital orthogonal base-band reception signals, one of which is an in-phase component and the other of which is its inverted signal, by each other in response to a band selection control signal from the band selection control means when the second band is used. There is an effect that reception data can be outputted properly even if there is a difference between the first and second bands in the high/low relationship between the reception frequency and the local oscillation frequency.

In the above dual-band data communication device, according to a sixth aspect of the present invention, the dual-band digital demodulation processing means includes a digital demodulation processing means for performing demodulation properly when the first band is used, and a replacement means for replacing two of the digital orthogonal base-band reception signals, one of which is a quadrature component and the other of which is its inverted signal, by each other in response to a band selection control signal from the band selection control means when the second band is used. There is an effect that reception data can be outputted properly even if there is a difference between the first and second bands in the high/low relationship between the reception frequency and the local oscillation frequency.

In the above dual-band data communication device, according to a seventh aspect of the present invention, the dual-band digital modulation processing means including a digital modulation processing means for performing modulation properly when the first band is used, and a logical means for performing EXCLUSIVE-ORing between a band selection control signal from the band selection control means and transmission data. There is an effect that a transmission wave can be outputted properly even if there is a difference between the first and second bands in the high/low relationship between the transmission frequency and the local oscillation frequency.

In the above dual-band data communication device, according to a eighth aspect of the present invention, the dual-band digital modulation processing means includes a digital modulation processing means for performing modulation properly when the first band is used, and a replacement means for replacing two of the digital orthogonal base-band transmission signals, one of which is an in-phase component and the other of which is a quadrature component, by each other in response to a band selection control signal when the second band is used. There is an effect that a transmission wave can be outputted properly even if there is a difference between the first and second bands in the high/low relationship between the transmission frequency and the local oscillation frequency.

In the above dual-band data communication device, according to a ninth aspect of the present invention, the dual-band digital modulation processing means includes a digital modulation processing means for performing modulation properly when the first band is used, and a replacement means for replacing two of the digital orthogonal base-band transmission signals, one of which is an in-phase component and the other of which is its inverted signal, by each other in response to a band selection control signal from the band selection control means when the second band is used. There is an effect that a transmission wave can be outputted properly even if there is a difference between the first and second bands in the high/low relationship between the transmission frequency and the local oscillation frequency.

In the above dual-band data communication device, according to a tenth aspect of the present invention, the dual-band digital modulation processing means includes a digital modulation processing means for performing modulation properly when the first band is used, and a replacement means for replacing two of the digital orthogonal base-band transmission signals, one of which is a quadrature component and the other of which is its inverted signal, by each other in response to a band selection control signal from the band selection control means when the second band is used. There is an effect that a transmission wave can be outputted properly even if there is a difference between the first and second bands in the high/low relationship between the transmission frequency and the local oscillation frequency.

DETAILED DESCRIPTION OF THE PREFERRED EMBODIMENTS

Embodiments of the present invention will be described below with reference to FIGS. 1 to 9.

(First Embodiment)

A first embodiment according to the present invention is a dual-band data communication device having a logical means for performing EXCLUSIVE-ORing between a band selection control signal and reception data.

Figure 1:
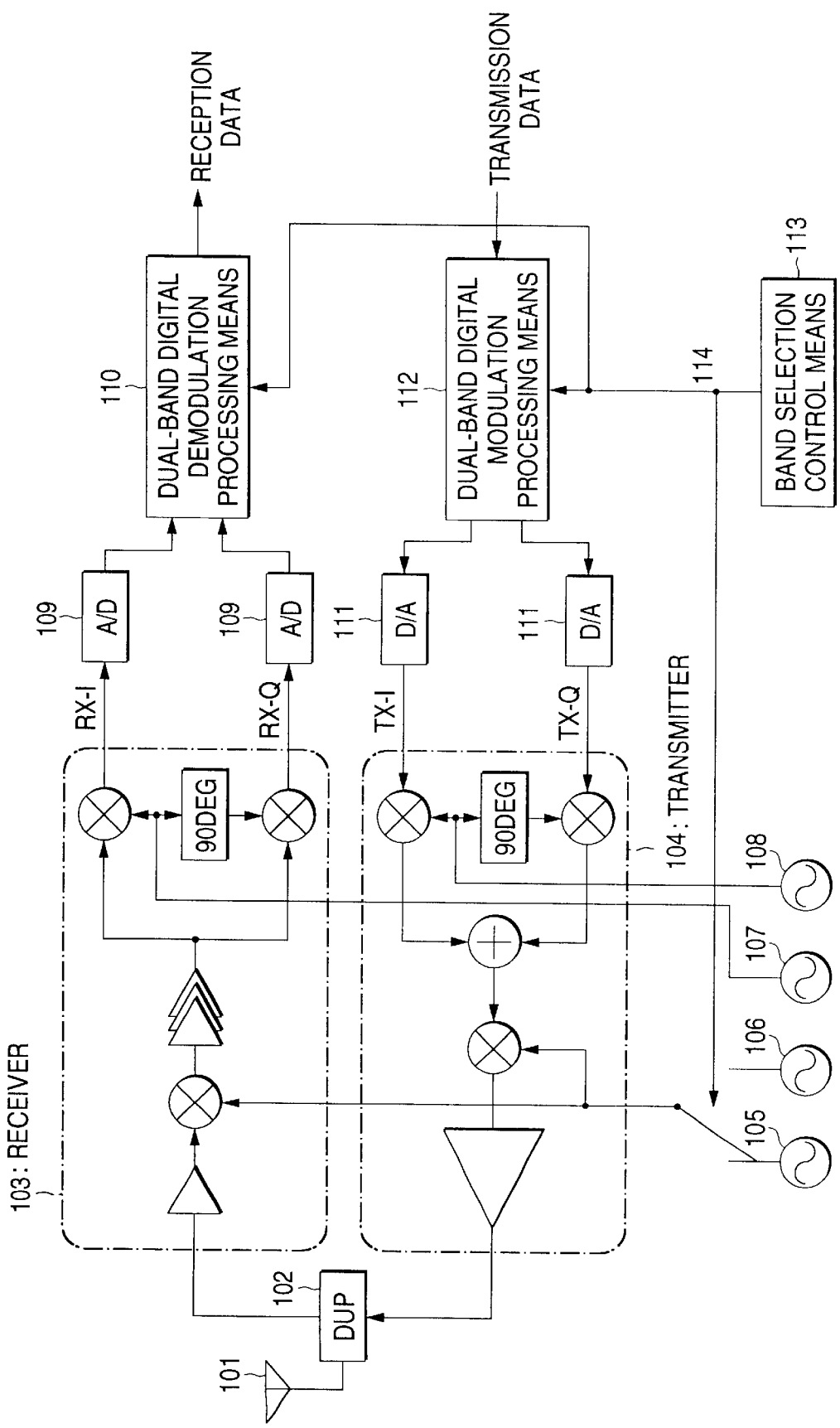
FIG. 1 is a block diagram of a dual-band data communication device which is used in common in each embodiment of the present invention.

FIG. 1 is a block diagram of a dual-band data communication device in this embodiment of the present invention. In FIG. 1, the dual-band data communication device is constituted by: an antenna 101 for transmitting/receiving a transmission/reception wave efficiently; a duplexer 102 for separating the transmission/reception wave into a transmission wave and a reception wave; a receiver 103 for converting the reception wave into two orthogonal base-band reception signals RX-I and RX-Q, the former one of which is an in-phase component and the latter one of which is a quadrature component respectively; a transmitter 104 for converting two orthogonal base-band reception signals TX-I and TX-Q, the former one of which is an in-phase component and the latter one of which is a quadrature component, into a transmission wave; a first local oscillator 105 for a first band used for frequency-conversion in the transmitter and the receiver; a first local oscillator 106 for a second band used for the same purpose as the first local oscillator 105; a reception second local oscillator 107 used for orthogonal detection in the receiver; a transmission second local oscillator 108 used for orthogonal modulation in the transmitter; A/D converters 109 for converting the orthogonal base-band reception signals RX-I and RX-Q into digital orthogonal base-band reception signals respectively; a dual-band digital demodulation processing means 110 for demodulating the digital orthogonal base-band reception signals into reception data; D/A converters 111 for converting digital orthogonal base-band transmission signals into orthogonal base-band transmission signals TX-I and TX-Q respectively, a dual-band digital modulation processing means 112 for modulating transmission data into digital orthogonal base-band transmission signals; and a band selection control means 113 for controlling the mode as to which one of the first and second bands is used.

The band selection control means 113 performs control for section between the first local oscillator 105 for the first band and the first local oscillator 106 for the second band by using a band selection control signal 114, and, at the same time, controls the dual-band digital demodulation processing means 110 and the dual-band digital modulation processing means 112.

Figure 2:
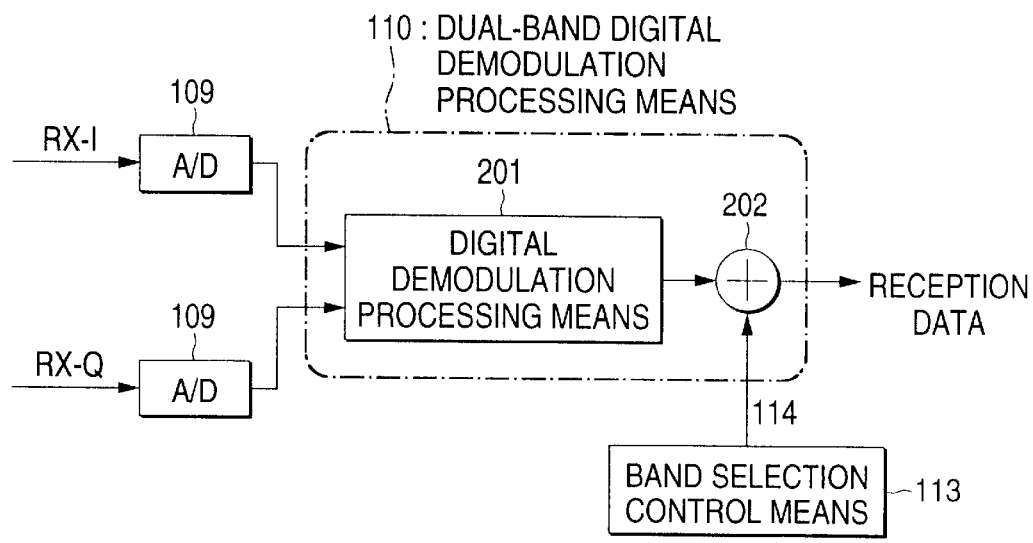
FIG. 2 is a block diagram of a dual-band digital demodulation processing means in a first embodiment of the present invention.

FIG. 2 is a detailed block diagram illustrating the dual-band digital demodulation processing means 110 in the thus configured dual-band data communication device. In FIG. 2, the dual-band digital demodulation processing means 110 is constituted by a digital demodulation processing means 201 and an EXCLUSIVE-OR circuit 202.

Assume now that the digital demodulation processing means 201 is set to perform demodulation properly when the first band is used, and that in the high/low relationship between the reception frequency and the first local oscillation frequency, there is a difference between the first and second bands. In this case, the direction of rotation of the phase of the digital orthogonal base-band reception signals is reversed when the second band is used. In differential phase modulation, for example, logic 0 is set when the direction of rotation of the phase is positive, while logic 1 is set when the direction of rotation of the phase is negative. Accordingly, when the direction of rotation of the phase is reversed, the output of the digital demodulation processing means 201 is inverted so that the logic 1 and the logic 0 are replaced by each other. Therefore, the band selection control signal 114 from the band selection control means 113 is set to take the logic 0 when the first band is used and to take the logic 1 when the second band is used. Then, EXCLUSIVE-ORing is carried out between the output of the digital demodulation processing means 201 and the band selection control signal 114 by means of the EXCLUSIVE-OR circuit 202. Consequently, the logic 1 and the logic 0 are replaced by each other again when the second band is used. As a result, it is possible to output reception data properly.

In the case where the digital demodulation processing means 201 performs demodulation properly when the second band is used, it will go well if the band selection control signal 114 is set to take the logic 1 when the first band is used, and to take the logic 0 when the second band is used. In the case where there is no difference between the first band and the second band in the high/low relationship between the reception frequency and the first local oscillation frequency, it will go well if the EXCLUSIVE-OR circuit 202 is bypassed, or made to be an inversion circuit. It is therefore possible to deal with any high/low relationship between the reception frequency and the first local oscillation frequency.

As has been described above, according to this embodiment, the digital demodulation processing means 201 and the EXCLUSIVE-OR circuit 202 are provided in the dual-band digital demodulation processing means 110. Accordingly, it is possible to output reception data properly even if there is a difference between the first and second bands in the high/low relationship between the reception frequency and the first local oscillation frequency. As a result, the degree of freedom in designing the first local oscillation frequency is increased.

(Second Embodiment)

A second embodiment of the present invention is a dual-band data communication device having means for replacing two digital orthogonal base-band reception signals, one of which is an in-phase component and the other of which is a quadrature component, by each other in accordance with a band selection control signal when a second band is used.

Figure 3:
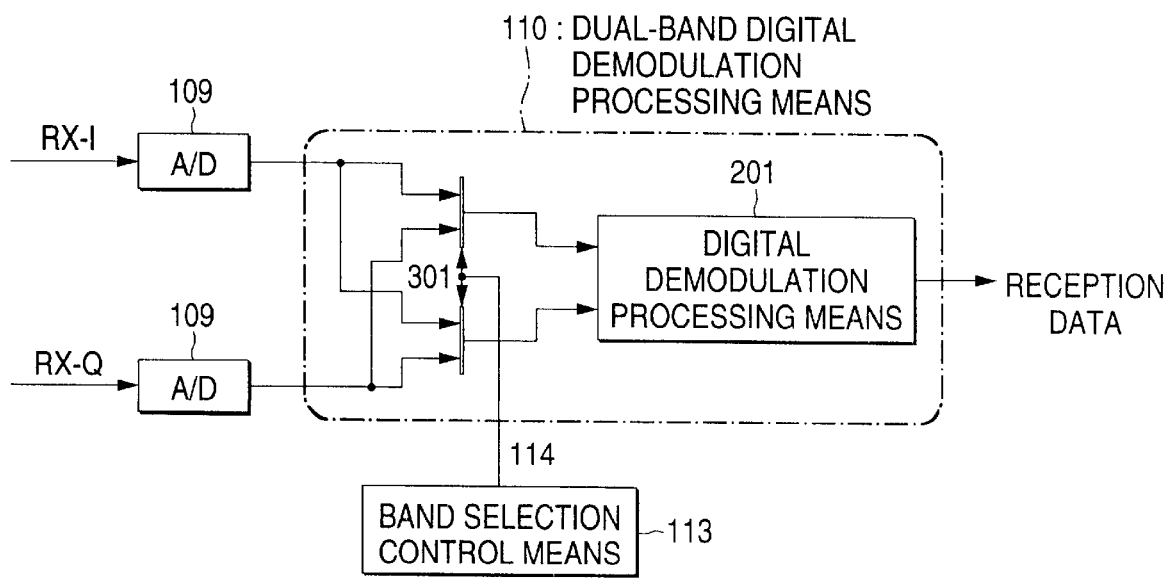
FIG. 3 is a block diagram of a dual-band digital demodulation processing means in a second embodiment of the present invention.

FIG. 3 is a detailed block diagram illustrating a dual-band digital demodulation processing means 110 in the dual-band data communication device shown in FIG. 1. In FIG. 3, the dual-band digital demodulation processing means 110 is constituted by two selectors 301 and a digital demodulation processing means 201.

Assume now that the digital demodulation processing means 201 is set to perform demodulation properly when the first band is used, and that in the high/low relationship between the reception frequency and the first local oscillation frequency, there is a difference between the first and second bands. In this case, the direction of rotation of the phase of the digital orthogonal base-band reception signals is reversed when the second band is used. Therefore, the two selectors 301 are controlled by the band selection control signal 114 supplied from the band selection control means 113 so as to return the direction of rotation of the phase to its original direction.

When the second band is used, a digital orthogonal base-band reception signal obtained by converting the orthogonal base-band reception signal RX-I which is an in-phase component by means of the A/D converter 109, and a digital orthogonal base-band reception signal obtained by converting the orthogonal base-band reception signal RX-Q which is a quadrature component by means of the other A/D converter 109 are replaced by each other. When the two digital orthogonal base-band reception signals one of which is an in-phase component and the other of which is a quadrature component are replaced by each other, the direction of rotation of the phase is reversed. Accordingly, the direction of rotation of the phase is reversed again so as to return to its original direction. It is therefore possible to output reception data properly.

In the case where the digital demodulation processing means 201 performs demodulation properly when the second band is used, it will go well if the two selectors 301 are controlled by the band selection control signal 114 so that the two digital orthogonal base-band reception signals, one of which is an in-phase component and the other of which is a quadrature component, are replaced by each other when the first band is used. In the case where there is no difference between the first and second bands in the high/low relationship between the reception frequency and the first local oscillation frequency, it will go well if the two selectors 301 are fixed in one state. It is therefore possible to deal with any high/low relationship between the reception frequency and the first local oscillation frequency.

As has been described above, according to this embodiment, the two selectors 301 and the digital demodulation processing means 201 are provided in the dual-band digital demodulation processing means 110. Accordingly, it is possible to output reception data properly even if there is a difference between the first and second bands in the high/low relationship between the reception frequency and the first local oscillation frequency. As a result, the degree of freedom in designing the first local oscillation frequency is increased.

(Third Embodiment)

A third embodiment of the present invention is a dual-band data communication device having means for replacing two digital orthogonal base-band reception signals, which are an in-phase component and its inverted signal, by each other in accordance with a band selection control signal when a second band is used.

Figure 4:
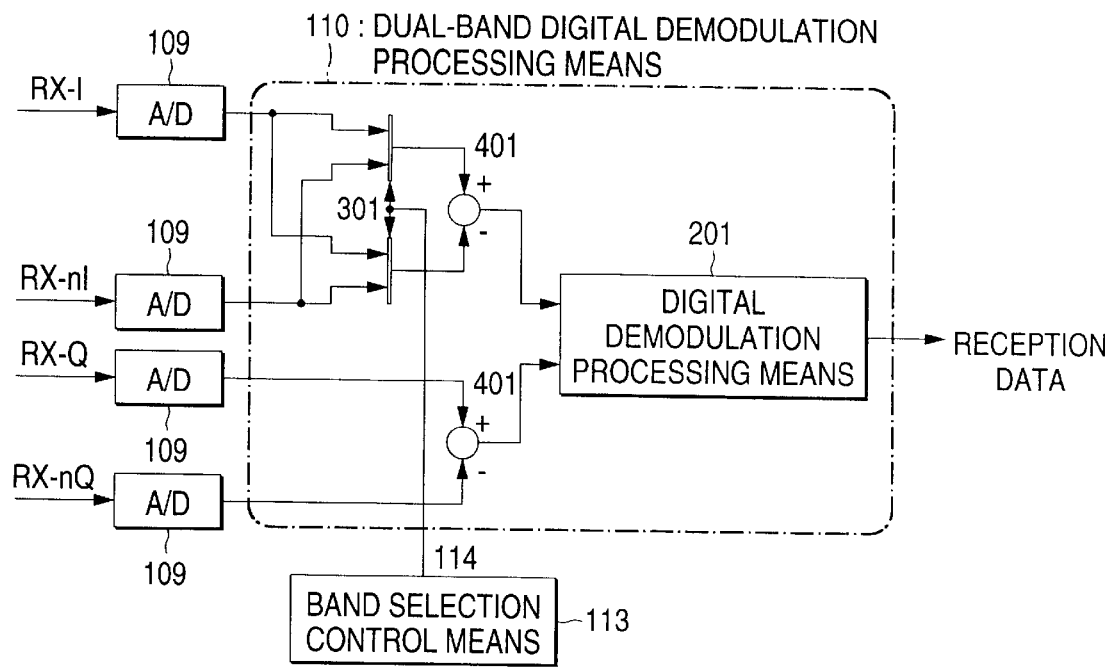
FIG. 4 is a block diagram of a dual-band digital demodulation processing means in a third embodiment of the present invention.

FIG. 4 is a detailed block diagram illustrating a dual-band digital demodulation processing means 110 in the dual-band data communication device shown in FIG. 1, wherein orthogonal base-band reception signals are balanced to improve the antinoise properties. In FIG. 4, an inverted signal of an orthogonal base-band reception signal RX-I which is an in-phase component is referenced by RX-nI, and an inverted signal of an orthogonal base-band reception signal RX-Q which is a quadrature component is referenced by RX-nQ. The dual-band digital demodulation processing means 110 is constituted by two selectors 301, two subtracters 401 and a digital demodulation processing means 201.

Assume now that the digital demodulation processing means 201 is set to perform demodulation properly when the first band is used, and that in the high/low relationship between the reception frequency and the first local oscillation frequency, there is a difference between the first and second bands. In this case, the direction of rotation of the phase of the digital orthogonal base-band reception signals is reversed when the second band is used. Therefore, the two selectors 301 are controlled by the band selection control signal 114 given from the band selection control means 113 so as to return the direction of rotation of the phase to its original direction.

When the second band is used, a digital orthogonal base-band reception signal obtained by converting the orthogonal base-band reception signal RX-I which is an in-phase component by means of the A/D converter 109, and a digital orthogonal base-band reception signal obtained by converting the inverted signal RX-nI of the orthogonal base-band reception signal RX-I which is an in-phase component by means of the A/D converter 109 are replaced by each other. As a result, the orthogonal base-band reception signal RX-I is inverted equivalently. Since both the components are inverted equivalently, the direction of rotation of the phase is reversed to return to its original direction. Accordingly, it is possible to output reception data properly.

In the case where the digital demodulation processing means 201 performs demodulation properly when the second band is used, it will go well if the two selectors 301 are controlled by the band selection control signal 114 so that the two digital orthogonal base-band reception signals which are an in-phase component and its inverted signal are replaced with each other. In the case where there is no difference between the first band and the second band in the high/low relationship between the reception frequency and the first local oscillation frequency, it will go well if the two selectors 301 are fixed to the state of one of them. It is therefore possible to deal with any high/low relationship between the reception frequency and the first local oscillation frequency.

As has been described above, according to this embodiment, the two selectors 301, the two subtracters 401 and the digital demodulation processing means 201 are provided in the dual-band digital demodulation processing means 110 in which orthogonal base-band reception signals are balanced to improve the antinoise properties. Accordingly, it is possible to output reception data properly even if there is a difference between the first and second bands in the high/low relationship between the reception frequency and the first local oscillation frequency. As a result, the degree of freedom in designing the first local oscillation frequency is increased.

(Fourth Embodiment)

A fourth embodiment of the present invention is a dual-band data communication device having means for replacing two digital orthogonal base-band reception signals, which are a quadrature component and its inverted signal, by each other in accordance with a band selection control signal when a second band is used.

Figure 5:
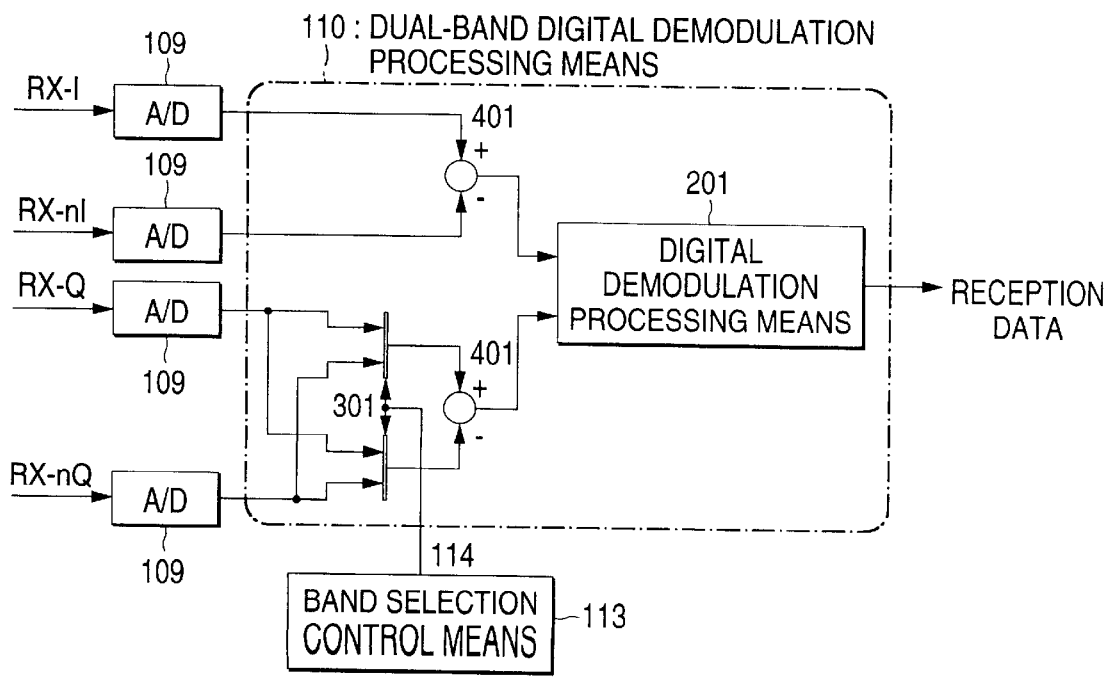
FIG. 5 is a block diagram of a dual-band digital demodulation processing means in a fourth embodiment of the present invention.

FIG. 5 is a detailed block diagram illustrating a dual-band digital demodulation processing means 110 in the dual-band data communication device shown in FIG. 1, wherein orthogonal base-band reception signals are balanced to improve the antinoise properties. In FIG. 5, an inverted signal of an orthogonal base-band reception signal RX-I which is an in-phase component is referenced by RX-nI, and an inverted signal of an orthogonal base-band reception signal RX-Q which is a quadrature component is referenced by RX-nQ. The dual-band digital demodulation processing means 110 is constituted by two selectors 301, two subtracters 401 and a digital demodulation processing means 201.

Assume now that the digital demodulation processing means 201 is set to perform demodulation properly when the first band is used, and that in the high/low relationship between the reception frequency and the first local oscillation frequency, there is a difference between the first and second bands. In this case, the direction of rotation of the phase of the digital orthogonal base-band reception signals is reversed when the second band is used. Therefore, the two selectors 301 are controlled by the band selection control signal 114 given from the band selection control means 113 so as to return the direction of rotation of the phase to its original direction.

When the second band is used, a digital orthogonal base-band reception signal obtained by converting the orthogonal base-band reception signal RX-Q which is a quadrature component by means of the A/D converter 109, and a digital orthogonal base-band reception signal obtained by converting the inverted signal RX-nQ of the orthogonal base-band reception signal RX-Q which is a quadrature component by means of the A/D converter 109 are replaced by each other. As a result, the inverted phase of the quadrature component is returned to its original phase. The direction of rotation of the phase is reversed to return to its original direction. Accordingly, it is possible to output reception data properly.

In the case where the digital demodulation processing means 201 performs demodulation properly when the second band is used, it will go well if the two selectors 301 are controlled by the band selection control signal 114 so that the two digital orthogonal base-band reception signals which are a quadrature component and its inverted signal are replaced with each other. In the case where there is no difference between the first band and the second band in the high/low relationship between the reception frequency and the first local oscillation frequency, it will go well if the two selectors 301 are fixed to the state of one of them. It is therefore possible to deal with any high/low relationship between the reception frequency and the first local oscillation frequency.

As has been described above, according to this embodiment, the two selectors 301, the two subtracters 401 and the digital demodulation processing means 201 are provided in the dual-band digital demodulation processing means 110 in which orthogonal base-band reception signals are balanced to improve the antinoise properties. Accordingly, it is possible to output reception data properly even if there is a difference between the first and second bands in the high/low relationship between the reception frequency and the first local oscillation frequency. As a result, the degree of freedom in designing the first local oscillation frequency is increased.

(Fifth Embodiment)

A fifth embodiment of the present invention is a dual-band data communication device having a logical means for performing EXCLUSIVE-ORing between a band selection control signal and transmission data.

Figure 6:
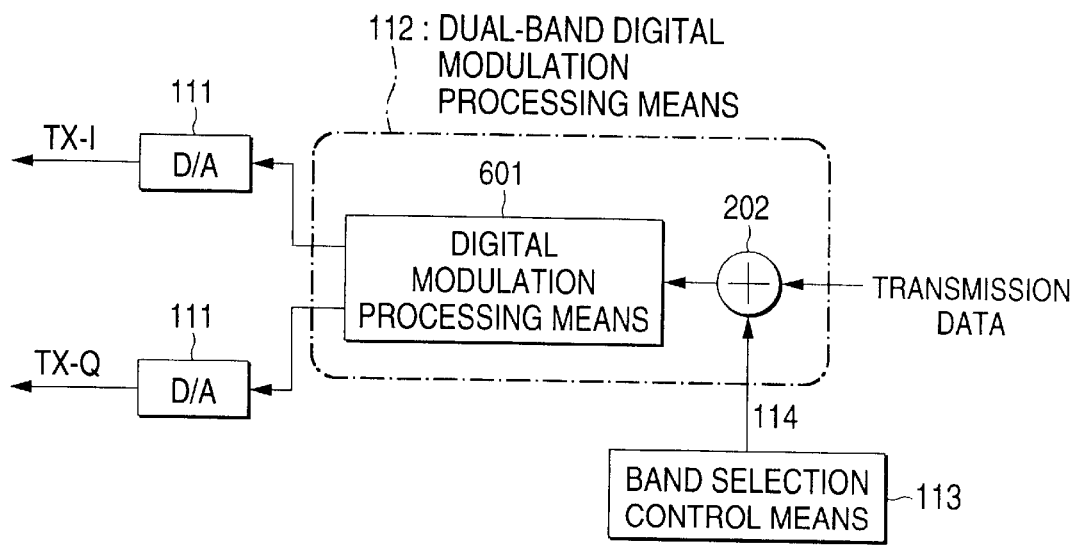
FIG. 6 is a block diagram of a dual-band digital modulation processing means in a fifth embodiment of the present invention.

FIG. 6 is a detailed block diagram of a dual-band digital modulation processing means 112 in the dual-band data communication device shown in FIG. 1. In FIG. 6, the dual-band digital modulation processing means 112 is constituted by an EXCLUSIVE-OR circuit 202 and a digital modulation processing means 601.

Assume now that the digital modulation processing means 601 is set to perform modulation properly when the first band is used, and that in the high/low relationship between the transmission frequency and the first local oscillation frequency, there is a difference between the first and second bands. In this case, the direction of rotation of the phase of a transmission wave outputted from the transmitter is reversed when the second band is used. The band selection control signal 114 given from the band selection control means 113 is set to take logic 0 when the first band is used and to take logic 1 when the second band is used. Then, EXCLUSIVE-ORing is performed, by means of the EXCLUSIVE-OR circuit 202, between the transmission data and the band selection control signal 114 given from the band selection control means 113.

When the second band is used, digital modulation is performed upon the transmission data after the logic 1 and the logic 0 are replaced by each other in advance. In such a manner, the direction of rotation of the phase of signals in which the direction of rotation of the phase of digital orthogonal base-band transmission signals and orthogonal base-band transmission signals has been reversed is reversed again in the transmitter. Accordingly, it is possible to output a transmission wave properly.

In the case where the digital modulation processing means 601 performs modulation properly when the second band is used, it will go well if the band selection control signal 114 is set in advance to take the logic 1 when the first band is used, and to take the logic 0 when the second band is used. In the case where there is no difference between the first and second bands in the high/low relationship between the transmission frequency and the first local oscillation frequency, it will go well if the EXCLUSIVE-OR circuit 202 is bypassed, or made to be an inversion circuit. It is therefore possible to deal with any high/low relationship between the transmission frequency and the first local oscillation frequency.

As has been described above, according to this embodiment, the EXCLUSIVE-OR circuit 202 and the digital modulation processing means 601 are provided in the dual-band digital modulation processing means 112. Accordingly, it is possible to output a transmission wave properly even if there is a difference between the first and second bands in the high/low relationship between the transmission frequency and the first local oscillation frequency. Accordingly, the degree of freedom in designing the first local oscillation frequency is increased.

(Sixth Embodiment)

A sixth embodiment of the present invention is a dual-band data communication device having means for replacing two digital orthogonal base-band transmission signals, one of which is an in-phase component and the other of which is a quadrature component, by each other in accordance with a band selection control signal when a second band is used.

Figure 7:
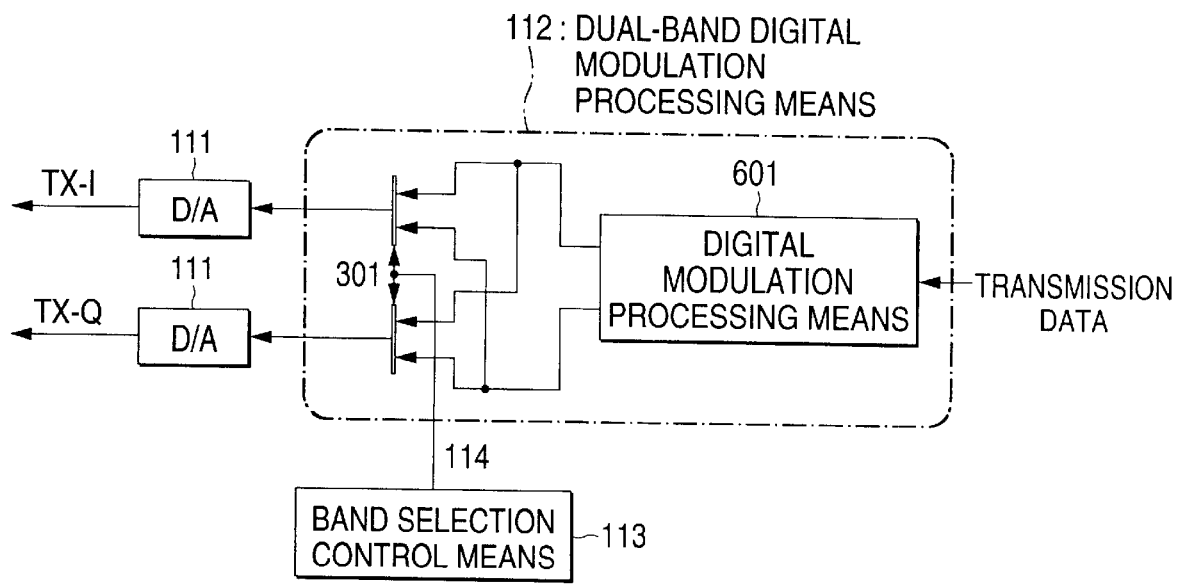
FIG. 7 is a block diagram of a dual-band digital modulation processing means in a sixth embodiment of the present invention.

FIG. 7 is a detailed block diagram illustrating a dual-band digital modulation processing means 112 in the dual-band data communication device shown in FIG. 1. In FIG. 7, the dual-band digital modulation processing means 112 is constituted by a digital modulation processing means 601 and two selectors 301.

Assume now that the digital modulation processing means 601 is set to perform modulation properly when the first band is used, and that in the high/low relationship between the transmission frequency and the first local oscillation frequency, there is a difference between the first and second bands. In this case, the direction of rotation of the phase of a transmission wave outputted from the transmitter is reversed when the second band is used. Therefore, the two selectors 301 are controlled by the band selection control signal 114 given from the band selection control means 113 so as to prevent the direction of rotation of the phase of the transmission wave from being reversed.

When the second band is used, a digital orthogonal base-band transmission signal to be converted by the D/A converter 111 into an orthogonal base-band transmission signal TX-I which is an in-phase component, and a digital orthogonal base-band transmission signal to be converted by the other D/A converter 111 into an orthogonal base-band transmission signal TX-Q which is a quadrature component are replaced by each other. As a result, the direction of rotation of the phase of the orthogonal base-band transmission signals is reversed. Since the direction of rotation of the phase is reversed again in the transmitter, it is possible to output a transmission wave properly.

In the case where the digital modulation processing means 601 performs modulation properly when the second band is used, it will go well if the two selectors 301 are controlled by the band selection control signal 114 so that the two digital orthogonal base-band transmission signals, one of which is an in-phase component and the other of which is a quadrature component, are replaced by each other when the first band is used. When there is no difference between the first and second bands in the high/low relationship between the transmission frequency and the first local oscillation frequency, it will go well if the two selectors 301 are fixed to the state of one of them. It is therefore possible to deal with any high/low relationship between the transmission frequency and the first local oscillation frequency.

As has been described above, according to this embodiment, the digital modulation processing means 601 and the two selectors 301 are provided in the dual-band digital modulation processing means 112. Accordingly, it is possible to output a transmission wave properly even if there is a difference between the first and second bands in the high/low relationship between the transmission frequency and the first local oscillation frequency. As a result, the degree of freedom in designing the first local oscillation frequency is increased.

(Seventh Embodiment)

A seventh embodiment of the present invention is a dual-band data communication device having means for replacing two digital orthogonal base-band transmission signals, which are an in-phase component and its inverted signal, by each other in accordance with a band selection control signal when a second band is used.

Figure 8:
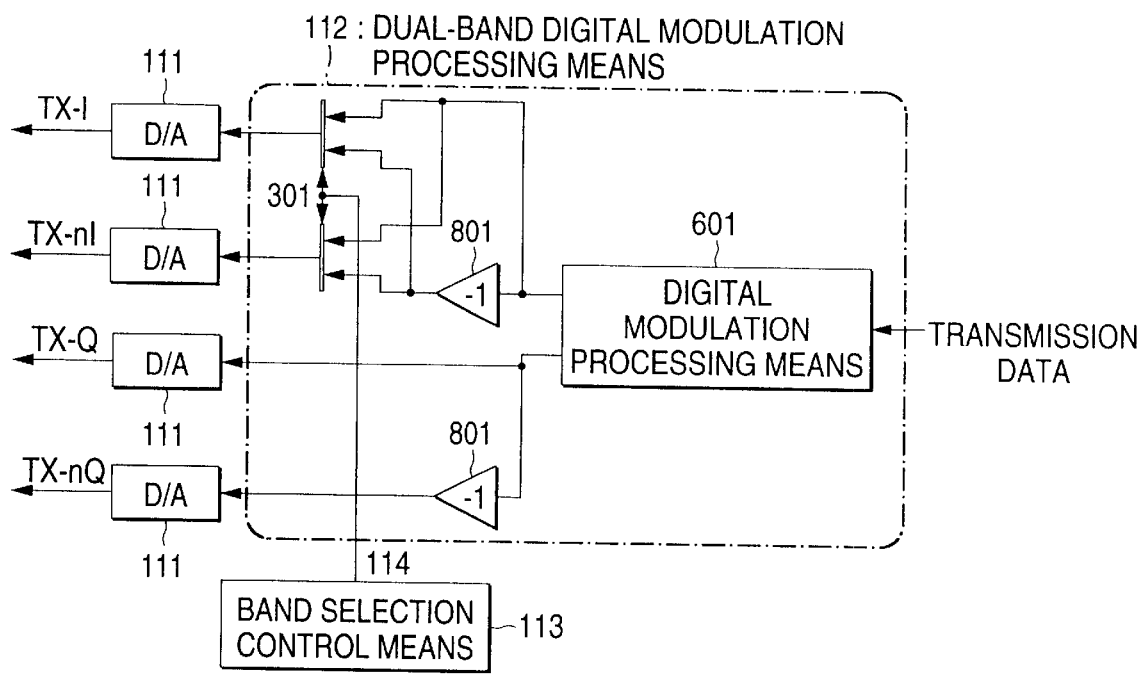
FIG. 8 is a block diagram of a dual-band digital modulation processing means in a seventh embodiment of the present invention.

FIG. 8 is a detailed block diagram illustrating a dual-band digital modulation processing means 112 in the dual-band data communication device shown in FIG. 1, wherein orthogonal base-band transmission signals are balanced to improve the antinoise properties. In FIG. 8, an inverted signal of an orthogonal base-band transmission signal TX-I which is an in-phase component is referenced by TX-nI, and an inverted signal of an orthogonal base-band transmission signal TX-Q which is a quadrature component is referenced by TX-nQ. The dual-band digital modulation processing means 112 is constituted by a digital modulation processing means 601, two inverters 801 and two selectors 301.

Assume now that the digital modulation processing means 601 is set to perform modulation properly when the first band is used, and that in the high/low relationship between the transmission frequency and the first local oscillation frequency, there is a difference between the first and second bands. In this case, the direction of rotation of the phase of a transmission wave outputted from the transmitter is reversed when the second band is used. Therefore, the two selectors 301 are controlled by the band selection control signal 114 given from the band selection control means 113 so as to prevent the direction of rotation of the phase of the transmission wave from being reversed.

When a second band is used, a digital orthogonal base-band transmission signal to be converted by the D/A converter 111 into the orthogonal base-band transmission signal TX-I which is an in-phase component, and a digital orthogonal base-band transmission signal to be converted by the D/A converter 111 into the inverted signal TX-nI of the orthogonal base-band transmission signal TX-I which is an in-phase component are replaced by each other. As a result, the direction of rotation of the phase of the orthogonal base-band transmission signals is reversed. Since the direction of rotation of the phase is reversed again in the transmitter, it is possible to output a transmission wave properly.

In the case where the digital modulation processing means 601 performs modulation properly when the second band is used, it will go well if the two selectors 301 are controlled by the band selection control signal 114 so that the two digital orthogonal base-band transmission signals, one of which is an in-phase component and the other of which is its inverted signal, are replaced by each other when the first band is used. When there is no difference between the first and second bands in the high/low relationship between the transmission frequency and the first local oscillation frequency, it will go well if the two selectors 301 are fixed to the state of one of them. It is therefore possible to deal with any high/low relationship between the transmission frequency and the first local oscillation frequency.

As has been described above, according to this embodiment, the digital modulation processing means 601, the two inverters 801 and the two selectors 301 are provided in the dual-band digital modulation processing means 112 in the case where orthogonal base-band transmission signals are balanced to improve the antinoise properties. Accordingly, it is possible to output a transmission wave properly even if there is a difference between the first and second bands in the high/low relationship between the transmission frequency and the first local oscillation frequency. As a result, the degree of freedom in designing the first local oscillation frequency is increased.

(Eighth Embodiment)

An eighth embodiment of the present invention is a dual-band data communication device having means for replacing two digital orthogonal base-band transmission signals, which are a quadrature component and its inverted signal, by each other in accordance with a band selection control signal when a second band is used.

Figure 9:
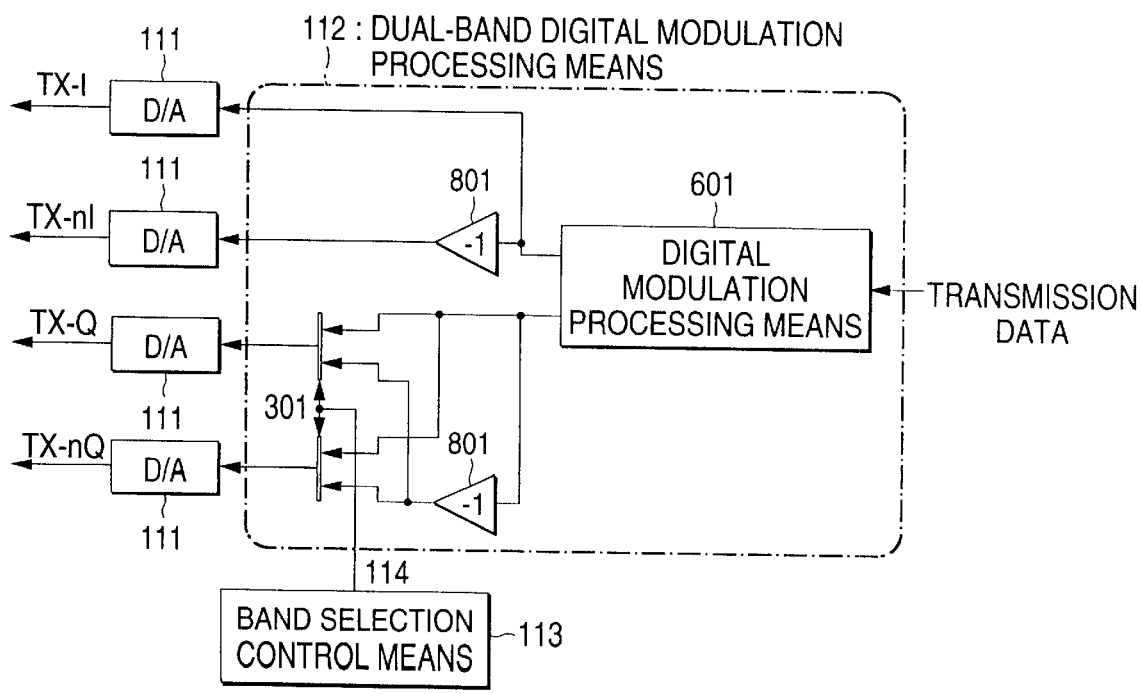
FIG. 9 is a block diagram of a dual-band digital modulation processing means in an eighth embodiment of the present invention.
Figure 10:
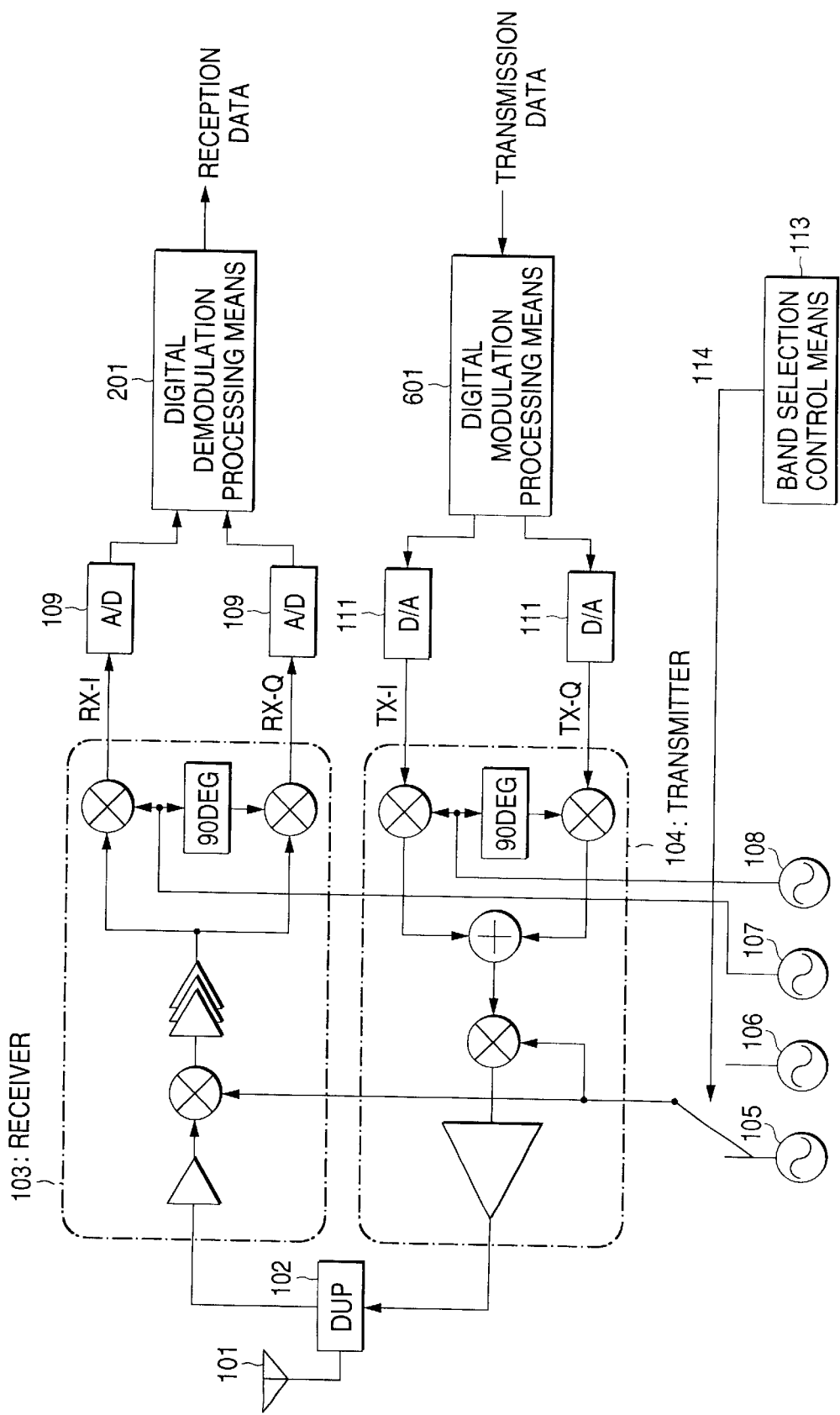
FIG. 10 is a block diagram of a conventional dual-band data communication device.

FIG. 9 is a detailed block diagram illustrating a dual-band digital modulation processing means 112 in the dual-band data communication device shown in FIG. 1, wherein orthogonal base-band transmission signals are balanced to improve the antinoise properties. In FIG. 9, an inverted signal of an orthogonal base-band transmission signal TX-I which is an in-phase component is referenced by TX-nI, and an inverted signal of an orthogonal base-band transmission signal TX-Q which is a quadrature component is referenced by TX-nQ. The dual-band digital modulation processing means 112 is constituted by a digital modulation processing means 201, two inverters 801 and two selectors 301.

Assume now that the digital modulation processing means 601 is set to perform modulation properly when the first band is used, and that in the high/low relationship between the transmission frequency and the first local oscillation frequency, there is a difference between the first and second bands. In this case, the direction of rotation of the phase of a transmission wave outputted from the transmitter is reversed when the second band is used. Therefore, the two selectors 301 are controlled in accordance with the band selection control signal 114 given from the band selection control means 113 so as to prevent the direction of rotation of the phase of the transmission wave from being reversed.

When the second band is used, a digital orthogonal base-band transmission signal to be converted by the D/A converter 111 into the orthogonal base-band transmission signal TX-Q which is a quadrature component, and a digital orthogonal base-band transmission signal to be converted by the other D/A converter 111 into the inverted signal TX-nQ of the orthogonal base-band transmission signal TX-Q which is a quadrature component are replaced by each other. As a result, the direction of rotation of the phase of the orthogonal base-band transmission signals is reversed. Since the direction of rotation of the phase is reversed again in the transmitter, it is possible to output a transmission wave properly.

In the case where the digital modulation processing means 601 performs modulation properly when the second band is used, it will go well if the two selectors 301 are controlled by the band selection control signal 114 so that the two digital orthogonal base-band transmission signals, one of which is a quadrature component and the other of which is its inverted signal, are replaced by each other when the first band is used. When there is no difference between the first and second bands in the high/low relationship between the transmission frequency and the first local oscillation frequency, it will go well if the two selectors 301 are fixed to the state of one of them. It is therefore possible to deal with any high/low relationship between the transmission frequency and the first local oscillation frequency.

As has been described above, according to this embodiment, the digital modulation processing means 601, the two inverters 801 and the two selectors 301 are provided in the dual-band digital modulation processing means 112 in the case where orthogonal base-band transmission signals are balanced to improve the antinoise properties. Accordingly, it is possible to output a transmission wave properly even if there is a difference between the first and second bands in the high/low relationship between the transmission frequency and the first local oscillation frequency. As a result, the degree of freedom in designing the first local oscillation frequency is increased.

Although description has been made, in each of the above-mentioned embodiments, about the case where the first local oscillators are used in common between a reception system and a transmission system, the present invention is not limited to this but applicable to the configuration in which separate first local oscillators are used individually in the reception system and the transmission system. In addition, although description has been made, in the above embodiments, about the case where separate first local oscillators are used individually for a first band and a second band, the present invention is not limited to this but applicable to the configuration in which the first local oscillator is used in common for the first band and the second band. In addition, although description has been made, in the above embodiments, about the case where the first local oscillators are independent of the second local oscillators, the present invention is not limited to this but applicable to the configuration in which a local oscillator is used in common as the first local oscillator and the second local oscillator.

As has been described above, according to the present invention, there are provided a dual-band digital demodulation processing means for performing demodulation properly and a dual-band digital modulation processing means for performing modulation properly in either case where the first band or the second band is used, in accordance with controlled selection between the first-band local oscillator and the second-band local oscillator by the band selection control means. Accordingly, reception data can be outputted properly even if there is a difference between the first and second bands in the high/low relationship between the reception frequency and the local oscillation frequency. In addition, a transmission wave can be outputted properly even if there is a difference between the first and second bands in the high/low relationship between the transmission frequency and the local oscillation frequency. As a result, it is possible to obtain an effect that the degree of freedom in designing the first-band local oscillator and the second-band local oscillator can be increased.

What is claimed is:

1. A dual-band data communication device comprising:
   a receiver for converting a reception wave into orthogonal base-band reception signals,
   A/D converters for converting said orthogonal base-band reception signals into digital orthogonal base-band reception signals,
   a dual-band digital demodulation processing means for demodulating said digital orthogonal base-band reception signals into reception data, a dual-band digital modulation processing means for modulating transmission data into digital orthogonal base-band transmission signals, D/A converters for converting said digital orthogonal base-band transmission signals into orthogonal base-band transmission signals, a transmitter for converting said orthogonal base-band transmission signals into a transmission wave, and a band selection control means for controlling selection as to which one of a first band and a second band is used, wherein said dual-band digital demodulation processing means includes;

means for performing demodulation properly when selected one of said first band and said second band is used in accordance with selection control between a first band local oscillation and a second band local oscillation by said band selection control means.

2. The dual-band data communication device of claim 1, wherein said dual-band digital modulation processing means includes;

means for performing modulation properly when selected one of said first band and said second band is used in accordance with the selection control between said first band local oscillation and said second band local oscillation by said band selection control means.

3. The dual-band data communication device of claim 1, wherein said dual-band digital demodulation processing means including;

a digital demodulation processing means for performing demodulation properly when said first band is used, and a logical means for performing EXCLUSIVE-ORing between a band selection control signal from said band selection control means and reception data from said digital demodulation processing means.

4. The dual-band data communication device of claim 1, wherein said dual-band digital demodulation processing means includes;

a digital demodulation processing means for performing demodulation properly when said first band is used, and a replacement means for replacing two of said digital orthogonal base-band reception signals, one of which is an in-phase component and the other of which is a quadrature component, by each other in response to a band selection control signal from said band selection control means when said second band is used.

5. The dual-band data communication device of claim 1, wherein said dual-band digital demodulation processing means includes;

a digital demodulation processing means for performing demodulation properly when said first band is used, and a replacement means for replacing two of said digital orthogonal base-band reception signals, one of which is an in-phase component and the other of which is the inverted signal thereof, by each other in response to a band selection control signal from said band selection control means when said second band is used.

6. The dual-band data communication device of claim 1, wherein said dual-band digital demodulation processing means includes;

a digital demodulation processing means for performing demodulation properly when said first band is used, and a replacement means for replacing two of said digital orthogonal base-band reception signals, one of which is a quadrature component and the other of which is the inverted signal thereof, by each other in response to a band selection control signal from said band selection control means when said second band is used.

7. The dual-band data communication device of claim 2, wherein said dual-band digital modulation processing means including;

a digital modulation processing means for performing modulation properly when said first band is used, and a logical means for performing EXCLUSIVE-ORing between a band selection control signal from said band selection control means and transmission data.

8. The dual-band data communication device of claim 2, wherein said dual-band digital modulation processing means includes;

a digital modulation processing means for performing modulation properly when said first band is used, and a replacement means for replacing two of said digital orthogonal base-band transmission signals, one of which is an in-phase component and the other of which is a quadrature component, by each other in response to a band selection control signal when said second band is used.

9. The dual-band data communication device of claim 2, wherein said dual-band digital modulation processing means includes;

a digital modulation processing means for performing modulation properly when said first band is used, and a replacement means for replacing two of said digital orthogonal base-band transmission signals, one of which is an in-phase component and the other of which is the inverted signal thereof, by each other in response to a band selection control signal from said band selection control means when said second band is used.

10. The dual-band data communication device of claim 2, wherein said dual-band digital modulation processing means includes;

a digital modulation processing means for performing modulation properly when said first band is used, and a replacement means for replacing two of said digital orthogonal base-band transmission signals, one of which is a quadrature component and the other of which is the inverted signal thereof, by each other in response to a band selection control signal from said band selection control means when said second band is used.

* * * * *